Dec. 22, 1942.   J. H. RICHARDS   2,305,737
BORING ATTACHMENT FOR MILLING MACHINES
Filed Jan. 21, 1941
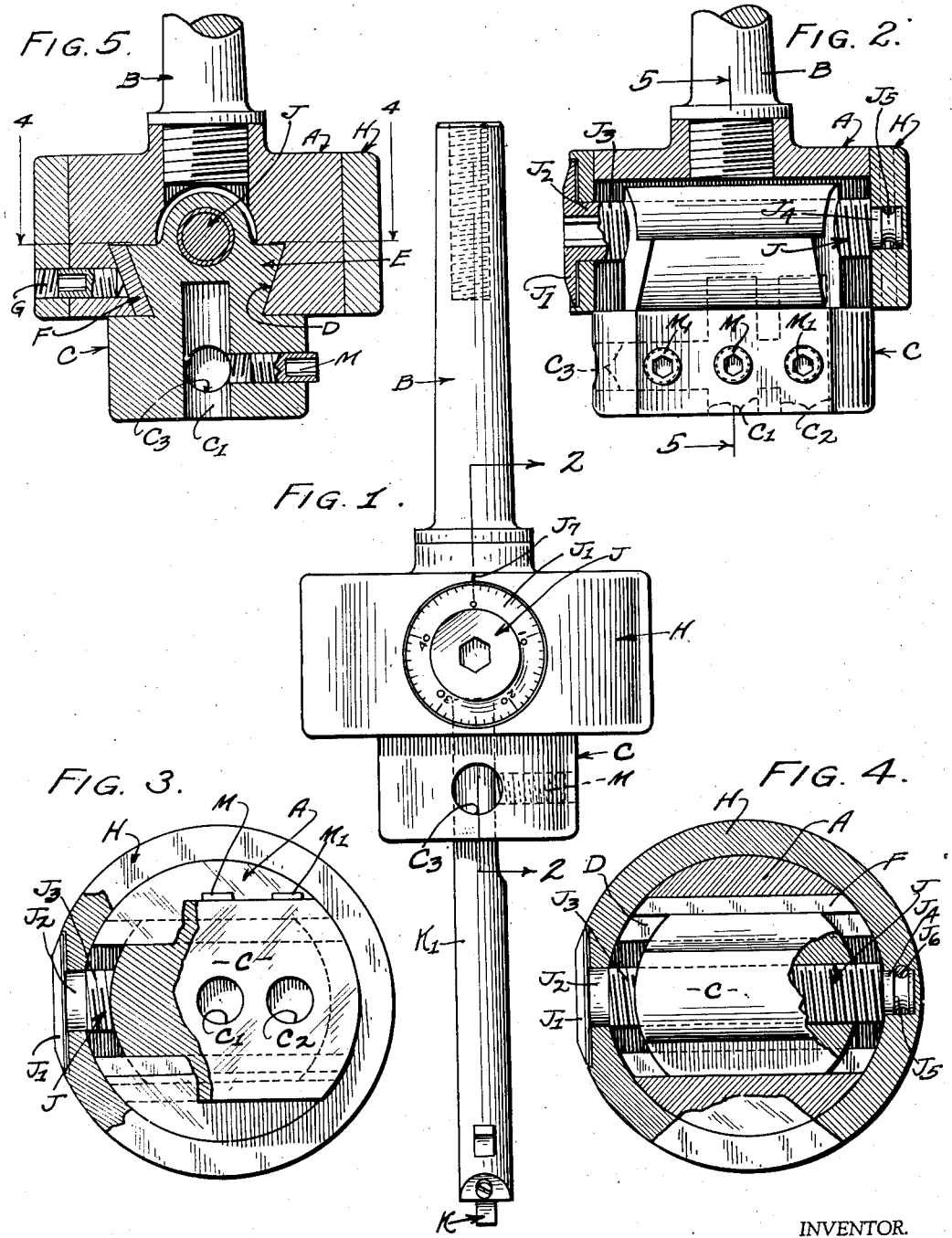
INVENTOR.
JAMES H. RICHARDS Patented Dec. 22, 1942

2,305,737

UNITED STATES PATENT OFFICE 2,305,737

BORING ATTACHMENT FOR MILLING MACHINES

James H. Richards, Glendale, Calif.

Application January 21, 1941, Serial No. 375,184

5 Claims. (Cl. 77—58)

This invention relates to and has for an object the provision of a boring device for milling machines, comprising a head with a stem adapted to be held on the arbor of a milling machine and on which a micrometrically adjustable tool holder is mounted for diametrical movement so as to variably position a boring tool relative to the work, said holder being provided with a plurality of differently positioned sockets for removably receiving a tool stem, so as to maximize the range of a tool in a device of given size.

An important object is to provide a device of the character herein described which will include an annular retaining member pressed or shrunk on the periphery of the head for reinforcing the tool holder against breakage when subjected to the strains occasioned by usage, and at the same time serves to retain and limit the movement of the holder against displacement.

A further object is to provide a tool holder having a base member formed with a reentrant groove diametrically across the face thereof and a tool holding member with a correspondingly formed rib on its adjacent side slidably engaging said groove, and a gib in said groove between one margin of the groove and the adjacent edge of said rib whereby a means such as a set screw may engage the gib instead of the rib when the holder is locked in a selected position for use, thereby preventing the impairment of an edge of the rib by frequent tightening of the set screw.

Other objects and advantages will appear as the description of my improvements progresses.

I have shown a preferred form of tool holder embodying my improvements in the accompanying drawing, in which:

Fig. 1 is a plan view of my improved device;

Fig. 2 is a sectional view of the same on line 2—2 of Fig. 1;

Fig. 3 is a face view of the tool holder partly in section;

Fig. 4 is a sectional view of the same on line 4—4 of Fig. 5; and

Fig. 5 is a sectional view of the same on line 5—5 of Fig. 2.

In a preferred form, my tool holder includes a base member A of circular form and having a stem B axially extended therefrom for attachment to the spindle of a milling or boring machine, by means of which the tool and holder are commonly rotated. A second member C forming a holder for the boring tool is diametrically slidable over the forward face of member A within prearranged limits as by means of a reentrant groove D formed on the face of member A and a rib E on member C corresponding in form to groove D, said rib and groove serving also to support the member C against displacement from member A. A gib F is inserted at one side of groove D between the adjacent margins of the groove and rib E and is engaged by the inner end of a set screw G which is screwed into member A and is cored to receive a hexagonal wrench of usual form by means of which said screw is tightened. Thus, the member C is locked in selected positions by said screw and said gib, the friction between the gib and the rib E serving to hold member A in position and preventing damage to the rib as when the set screw is directly applied to the rib.

When members A and C and gib F are assembled as described, an annular member H is pressed, shrunk or otherwise fitted over the periphery of or attached to member A with the forward portion thereof overlying and surrounding at least the inner portion of the rib E of member C, so as to retain member C on member A and provide a reinforcement of the holder against breakage, particularly at the margins of groove D where the points of greatest weakness exist. Also, member H serves to limit the movement of member C by the engagement of the ends of rib E with the inner periphery of ring H at the open ends of groove D.

Holder C is adjusted micrometrically and diametrically across the face of member A by means of a screw J which has an externally calibrated thin flat head $J_1$ seated on a flattened portion of ring H, a portion $J_2$ rotatable in a bore of said ring, a threaded body $J_3$ screwed into member A and in parallel with rib E, and a reduced end portion $J_4$ rotatable in a bore in ring H. Screw J is adapted to be turned as by means of a wrench for correspondingly advancing and retracting member C on member A for selectively positioning a boring tool supported on the holder. Portion $J_4$ has an annular groove $J_5$ engageable with a pin $J_6$ carried by member H for removably holding member J in operative position.

It will be observed that member C is provided with a plurality of sockets for receiving and holding a boring tool in operative position. Such sockets may include a pair of bores $C_1$ and $C_2$ paralleling the axis of member A and at least one radial bore $C_3$, all of which are adapted to receive the stem $K_1$ of a tool K, suitably carried by said stem. Bore $C_1$ is preferably nearly or quite coaxial with member C while bore $C_2$ is spaced therefrom to such an extent that the range of the operatively supported tool will extend from a point or circle as close to the axis of member A as practicable to a point or circle coincident with or even outwardly of the periphery of member H. Bore $C_3$ supports the tool K from a point where the same would be operative when supported in bore $C_2$ to a point substantially outwardly of ring H, depending upon practicable operable conditions and the length of the tool stem.

A single wrench operated set screw M is carried by member C for locking the tool stem in either of the bores $C_1$ and $C_3$ inasmuch as said bores intersect, and a separate but similar set screw $M_1$ is provided for bore $C_2$. Thus, the tool may be supported in various positions, selectively, and is operatively supported for boring very small or large pieces of work with the same holder, merely by differently disposing the tool on the holder relative to the work.

A single wrench or a set of wrenches of different sizes may be supplied with each device for operating screw J and the set screws associated with gib F and bores $C_1$, $C_2$, and $C_3$.

In operation, the tool K is positioned approximately for use by inserting its stem $K_1$ in one of the bores or sockets $C_1$, $C_2$, or $C_3$ and locked by means of the proper associated set screw. The minimum sized bore possible, of course, would be but slightly larger than stem $K_1$ when it is held in bore $C_1$, and the maximum would be of a diameter such as would be practicable, as in wing boring, when the stem $K_1$ is held in bore $C_3$ with the tool K extended radially from the holder. In every case the tool is micrometrically adjusted outwardly for succeeding cuts by sufficiently turning screw J as determined by the size of the bore to be made, the character of the work or other operating conditions, all of which operations and conditions are well known to metal workers. Hence, further description of the use and operations of my boring tool are deemed unnecessary.

The reduced end portion $J_4$ of screw J may be annularly grooved as at $J_5$ for engagement with a retaining pin $J_6$ by means of which the screw J may not be displaced from the holder except intentionally through the removal of said pin. The head $J_1$ of screw J is suitably calibrated for registration with a mark as at $J_7$ on the ring H for indicating the adjustment of the holder on the head. One or more of the bores $C_3$ may be provided on the holder as may be necessary.

What I claim is:

1. A boring device comprising: a head attachable to a boring machine, a tool holder diametrically adjustable on the outer face of said head, and a ring overlying said head and at least a portion of said holder and providing reinforcement against damage to said head under the strains of usage and serving to limit the adjustment of said holder, interlocking portions on said head and said holder for slidably supporting the holder on the head for varying the position of the tool relative to the axis of the head, and means intermediate said interlocking portions and frictionally engaging the same for holding said holder in selected positions on said head.

2. A boring device comprising: a head attachable to a boring machine, a tool holder diametrically adjustable on the outer face of said head, and a ring overlying said head and at least a portion of said holder and providing reinforcement against damage to said head under the strains of usage and serving to limit the adjustment of said holder, an interlocking tongue and groove connection between said head and said holder, and means between said tongue and a portion of said groove adapted to frictionally engage the tongue and groove for maintaining established positions of said holder on said head.

3. A boring device comprising: a head attachable to a boring machine, a tool holder diametrically adjustable on the outer face of said head, and a ring overlying said head and at least a portion of said holder and providing reinforcement against damage to said head under the strains of usage and serving to limit the adjustment of said holder, a tongue on one of said members, a groove being formed in said other member to slidably receive said tongue, a gib between a side of said tongue and the adjacent side of said groove, and means for frictionally locking said gib and said tongue against movement in said groove.

4. A boring device comprising: a head attachable to a boring machine, a tool holder diametrically adjustable on the outer face of said head, said head and said holder having interlocking portions, and a ring overlying said head and at least a portion of said holder and providing reinforcement against damage to said head under the strains of usage and serving to limit the adjustment of said holder, and a gib frictionally engageable with the interlocking portions of said head and holder, as described.

5. A boring device comprising: a head having a body and a stem for attachment to a boring machine, a tool holder slidably interlocked with said head, means for adjusting said holder on said head, and a ring fixed to said head and encompassing said head and a portion of said holder, one of said members having a reentrant groove and the other member having a rib slidable in said groove, a gib in said groove frictionally engaging said rib, and means for locking said gib and said holder in selected positions.

JAMES H. RICHARDS.